Patented Dec. 8, 1936

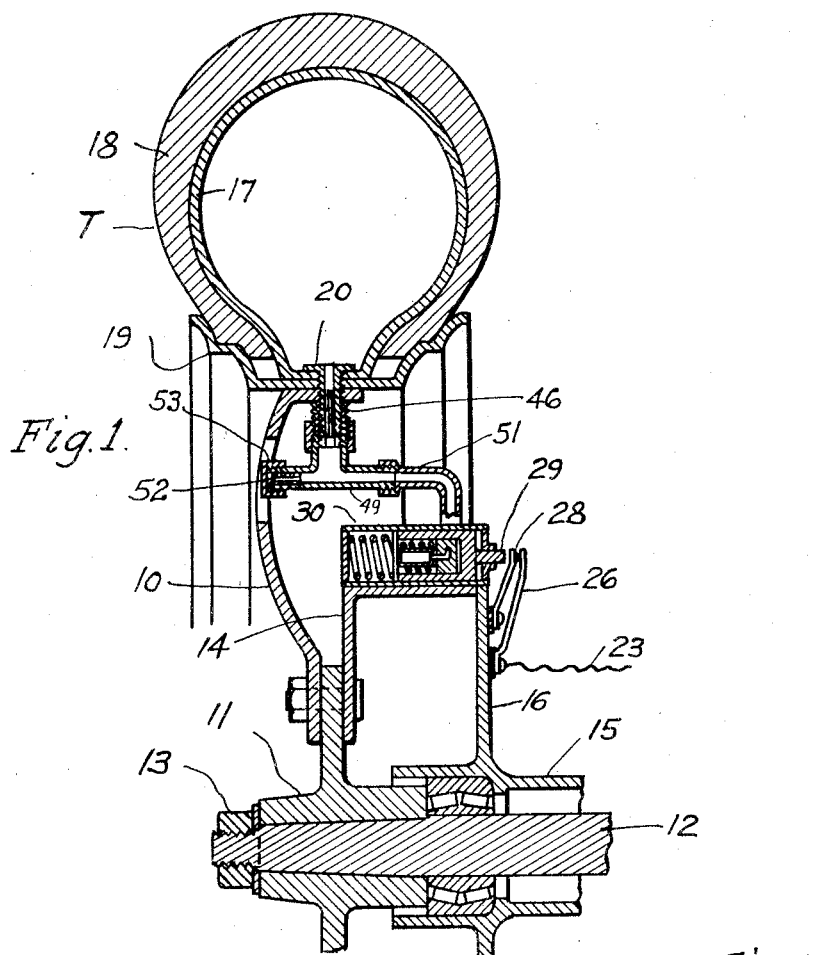
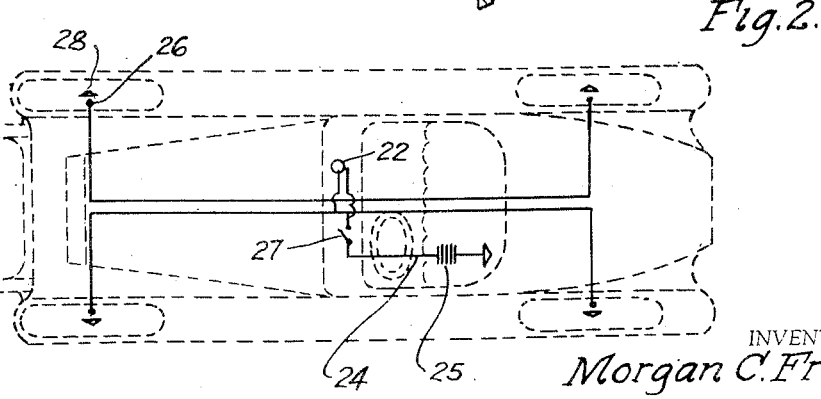

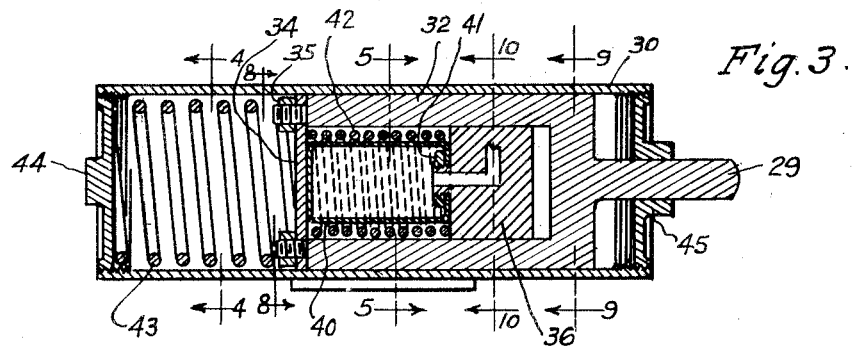
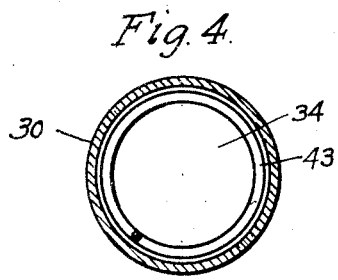
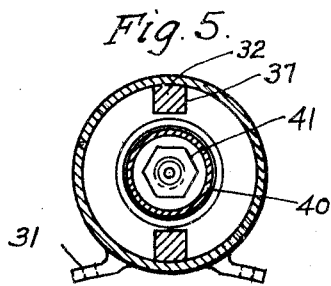
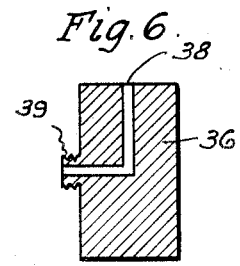
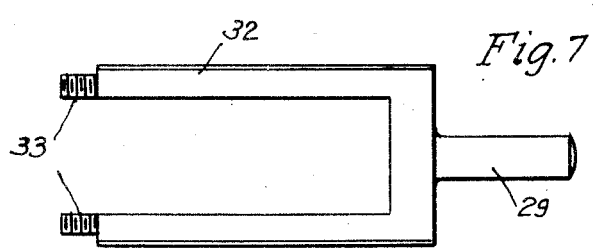
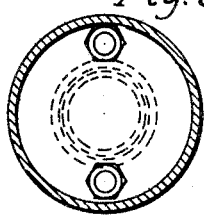
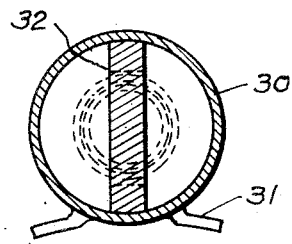
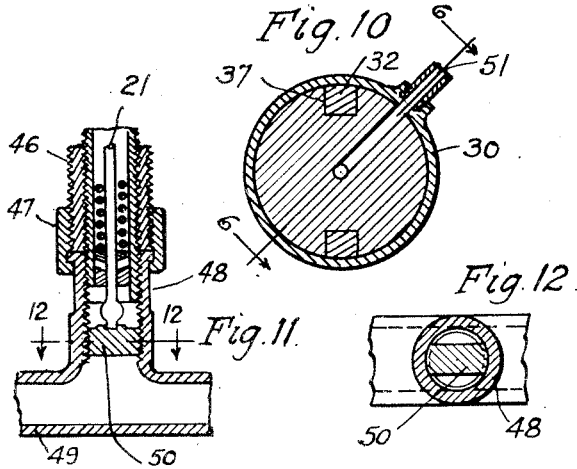

2,063,871

UNITED STATES PATENT OFFICE 2,063,871

PNEUMATIC TIRE ALARM

Morgan C. French, Brighton, Colo.

Application March 28, 1935, Serial No. 13,549

3 Claims. (Cl. 200—58)

This invention relates to tire alarm devices whereby the operator of a vehicle will be enabled to determine the condition of each tire on the vehicle.

An object of this invention is to provide a switch operator which is so constructed that it can be readily mounted on the present constructions of tires without changing the construction thereof and which may also be mounted on the parts associated with the wheel so that the wheel of the vehicle with the tire thereon may be used in the normal manner.

A further object of this invention is to provide a pneumatic circuit closer for an electrically operated signal which is under the same air pressure as the pressure within the tire so that when the air pressure is normal within the tire, the circuit closer will be held in inoperative position.

A still further object of this invention is to provide a device of this kind which is exceedingly simple in construction so that it will not involve the use of a number of movable parts and which is thereby rendered easy of operation and which may be constructed at a relatively small cost.

The above and various other objects and advantages of this invention will in part be described and in part be understood from the following detailed description of the present preferred embodiment, the same being illustrated in the accompanying drawings wherein:

Figure 1 is a fragmentary vertical section through a wheel having a pneumatic tire mounted thereon and provided with a signal means constructed according to an embodiment of this invention;

Figure 2 is a diagrammatic view of the electric circuits with which the circuit closer shown in Figure 1 is associated;

Figure 3 is an enlarged longitudinal section taken through substantially the center of the circuit closer;

Figure 4 is a sectional view taken on the line 4—4 of Figure 3;

Figure 5 is a sectional view taken on the line 5—5 of Figure 3;

Figure 6 is a sectional view taken on the line 6—6 of Figure 10;

Figure 7 is a detail side elevation of the forked circuit closing member shown in Figure 3;

Figure 8 is an end elevation of the plunger within the circuit closing housing;

Figure 9 is a sectional view taken on the line 9—9 of Figure 3;

Figure 10 is a sectional view taken on the line 10—10 of Figure 3;

Figure 11 is a fragmentary enlarged sectional view through the stem attachment;

Figure 12 is a fragmentary sectional view taken on the line 12—12 of Figure 11.

Referring to the drawings wherein like numerals of reference designate corresponding parts throughout the several views, the numeral 10 designates generally a wheel provided with a hub 11 mounted on an axle or spindle 12. The wheel 10 is held on the axle 12 by means of a threaded nut 13. The wheel 10 also has secured thereto a brake drum 14 of conventional construction which, in the present instance, opens inwardly of the vehicle, and the axle housing 15 for the axle 12 has an annular plate 16 fixed thereto and of substantially the diameter of the drum 14. It will be understood that in the present construction the brake band and the means for operating the band may be mounted on the inside of the drum 14.

A pneumatic tire generally designated as T, which embodies an inner casing 17 and an outer casing 18, is mounted on the rim 19 secured to the wheel 14. This inner casing 17 is provided with a valve stem 20 of conventional construction and the valve stem 20 has the usual valve insides 21 more particularly shown in Figure 11.

In order to provide a means whereby the operator of the vehicle may know the condition of each tire T, I have provided a signal 22 which, in the present instance, may be mounted on the dashboard of the vehicle and may be in the form of a light or audible signal and which is connected in an electric circuit embodying a conductor 23 and a second conductor 24. The conductor 24 is connected, in the present instance, to one side of a battery 25, which is grounded to the frame of the vehicle and the conductor 23 is connected to a fixed contact 26 which is secured to the fixed plate 16. If desired, a manually operable switch 27 may be interposed in the electric circuit and, in the present instance, is connected to the conductor 24 between the battery 25 and the signal 22.

A movable contact 28 is disposed adjacent the fixed contact 26 and, in the present instance, this movable contact 28 is an annulus or ring which is normally positioned out of engagement with the fixed contact 26. The movable contact 28 is secured to the plate 16 and, if desired, may be uninsulated therefrom whereas the fixed contact 26 may be insulated from the plate 16 so that when these two contacts are in engagement with each other and the main switch 27 is closed, the circuit embodying the conductors 23 and 24 will be closed.

The movable contact 28 is operated or moved into engagement with the fixed contact 26 by means of a plunger 29 carried by a housing 30 mounted as by lugs 31 onto the periphery of the brake drum 14. The plunger 29 has secured to the inner end thereof a substantially U-shaped slide member 32 shown in detail in Figure 7. This U-shaped member is in the present instance made integral with the plunger 29 and comprises a fork or bifurcated part which is slidable within the cylindrical casing 30. The free ends of the fork or U-shaped member 32 are provided with threads 33 and a plate 34 is secured to the inner ends of the bifurcated member 32 as by nuts 35.

A stationary plug or member 36 is disposed within the casing 30 and is provided with slots or guideways 37 to loosely receive the parallel arms of the fork 32 so that this member may slide longitudinally of the casing 30, but is held against rotary movement with respect thereto. The plug or stationary member 36 has an air passage 38 therein which opens through one end of the plug, preferably the inner end, and this end is provided with a threaded boss 39.

An expansible plunger operating member 40 is disposed between the forks of the member 32 and secured as by a nut 41, and this expansible member 40 is disposed between the inner end of the stationary member 36 and the plate 34. A spring 42 is disposed about the periphery of the expansible member 40 and engages at its forward end against the inner end of the stationary member 36 and at its rear end engages against the plate 34 so as to coact with the expansible member 40 in moving the plunger 29 inwardly and out of engagement with the movable contact 28. A plunger operating spring 43 is disposed within the cylinder or casing 30 and at one end engages against the inner end of the forked member 32 and at the other end engages against an end member 44 which in the present instance is threaded into the inner end of the casing 30. This spring 43 acts to move the plunger 29 forwardly or outwardly of the end 45 opposite from the end member 44 and to move the movable contact 28 into engagement with the fixed contact 26.

In order to provide a means whereby the air pressure in the expansible member 40 may be equal to the air pressure within the inner tube 17, I have provided a threaded sleeve 46 which is threaded onto the stem 20 of the inner tube 17, and an annular nut 47 is threaded onto this sleeve 46 and swivelly engages the stem portion 48 of a T-member 49. This T-member 49 has the stem portion thereof provided with interior threads and a plug 50 is threaded into the stem portion 48 and contacts with the valve member of the valve insides 21 so that this valve insides will be held in open position. In this manner, the air pressure within the tube 17 will be communicated to the T 49 and this T 49 is connected as by a pipe 51 to the housing 30. The pipe 51 communicates with the air passage 38 in the plug 36. Preferably, the valve plug 50 is flattened on opposite sides so that air may freely pass by this plug and enter the air passage 38 so as to maintain the expansible member 40 in expanded condition and thereby hold the plunger 29 in inoperative position against the tension of the spring 43. The T 49 has on one side thereof a valve insides 52 and a cap 53 may be used to close this end of the T. This valve insides 52 may be used to fill the inner tube 17 with the desired air pressure.

In the use and operation of this alarm and signal means, the switch 27 when the car is in operation, is normally in closed position so as to complete one side of the electric circuit from the battery 25 to the signal 22. The other side of the circuit to which the signal 22 is connected embodies the conductor 23 and the two normally spaced apart contacts 26 and 28. The tire 17 is filled with the desired quantity of air which enters the inner tube 17 through the valve insides 52. As the normal valve insides 21 is held in open position by the plug 50, the air pressure of the inner tube 17 will extend through the pipe 51 and the passage 38 to the bladder or expansible member 40. This member 40 is preferably constructed of rubber or other yieldable material. The air pressure in the expansible member 40 will move this member 40 longitudinally so as to expand the member longitudinally rather than circumferentially. This longitudinal expansion is permitted by reason of the spring 42 which closely engages about the periphery of the expansible member 40. When the air pressure in the inner tube 17 and, therefore, when the pressure in the expansible member 40 decreases sufficiently to permit the plunger operating spring 43 to become active, the plunger 29 will be moved outwardly through the guide member 46 and outward movement of the plunger 29 will force the movable contact 28 into engagement with the fixed contact 26. The electric circuit to the signal 22 is thereby completed so that this signal will be actuated and as heretofore stated, this signal may be either an audible signal or a visible signal in the form of a lamp bulb. If desired, all of the tires on the vehicle may be connected in the same electric circuit with the signal 22 so that when one of the tires becomes partially or completely deflated, the signal 22 will operate. If desired, there may be a separate signal 22 for each tire but such is not necessary inasmuch as when the signal 22 is actuated, the operator of the vehicle will, as a matter of course, examine the tires of the vehicle and only one signal will be necessary to call the operator's attention to the fact that at least one tire is deflated to a dangerous point.

It will be apparent from the foregoing that an exceedingly simple and practical tire alarm means has been disclosed whereby the operator of a vehicle may be able to tell at a glance the condition of a single tire or all of the tires, and where a tire is being gradually deflated, considerable damage will be prevented by stopping the vehicle before the underinflated tire becomes completely deflated. Where a blow-out occurs, it is, of course, understood that the signal will be immediately flashed and the operator will promptly stop the vehicle.

What is claimed is:—

1. A pressure operated circuit closing means for a pair of normally spaced apart contacts comprising a casing, means for mounting the casing on a part movable with the wheel of a vehicle, a plunger carried by the casing and disposed in confronting relation to one of said contacts, a U-shaped slide member disposed within the casing and connected to the plunger, an expansible member disposed between the parallel legs of said U-shaped slide member, a plate connecting the free ends of the U-shaped member and engaging against an end of the expansible member to hold the plunger in inoperative position when the expansible member is expanded and a tensionable spring disposed within the casing and engaging against the inner ends of the U-shaped member for moving said member longitudinally of the casing upon decrease of the pressure within the expansible member to thereby maintain said plunger in engagement with said one contact.

2. A pressure operated circuit closing means for a pair of normally spaced apart contacts comprising a casing, means for mounting the casing on a part rotatable with a wheel of a vehicle, a plunger slidably carried by the casing, a bifurcated member secured to the plunger and slidable within the casing, a stationary plug disposed within the casing and provided with diametrically opposed slots within which the arms of said bifurcated member are slidable, said plug having an air passage therein, an expansible member disposed between the arms of said bifurcated member and connected to the plug, said expansible member communicating at one end with the air passage, a spring disposed about said expansible member and coacting therewith to maintain the plunger in inoperative position, a plunger operating spring disposed within the casing and operable upon decrease of pressure in the expansible member to move said plunger into circuit closing position, means for tensioning said spring, and a pipe connected to the casing and communicating with the air passage in the plug.

3. Pressure responsive operating means comprising a casing, a plunger slidable through an end of the casing, a bifurcated member secured to the plunger and slidable within the casing, a stationary plug disposed within the casing intermediate the ends thereof and provided with diametrically opposed slots within which the arms of the bifurcated member are slidable, a plate connecting the free ends of the bifurcated member, an expansible member disposed between the free ends of the member intermediate the plate and an end of the plug for moving the plunger inwardly of the casing, a spring disposed about the expansible member and coacting therewith to hold the plunger in inoperative position, said stationary plug having an air passage communicating with the expansible member, means for connecting the air passage to a source of air pressure supply, a plunger operating spring disposed within the casing and normally maintained in inactive position when the pressure in the expansible member is normal, and means for tensioning said latter spring.

MORGAN C. FRENCH.